(12) United States Patent
Wachenschwanz et al.

(10) Patent No.: US 7,549,209 B2
(45) Date of Patent: Jun. 23, 2009

(54) METHOD OF FABRICATING A MAGNETIC DISCRETE TRACK RECORDING DISK

(75) Inventors: David E. Wachenschwanz, Saratoga, CA (US); Gerardo A. Bertero, Redwood City, CA (US); David Treves, Palo Alto, CA (US); Andrew Homola, Morgan Hill, CA (US); James L. Chao, Fremont, CA (US); Christopher H. Bajorek, Los Gatos, CA (US)

(73) Assignee: WD Media, Inc., San Jose, CA (US)

( * ) Notice: Subject to any disclaimer, the term of this patent is extended or adjusted under 35 U.S.C. 154(b) by 509 days.

(21) Appl. No.: 11/040,519

(22) Filed: Jan. 21, 2005

(65) Prior Publication Data

US 2005/0120545 A1  Jun. 9, 2005

Related U.S. Application Data

(62) Division of application No. 10/306,182, filed on Nov. 27, 2002, now abandoned.

(51) Int. Cl.
*G11B 5/84* (2006.01)
*G11B 5/855* (2006.01)

(52) U.S. Cl. .................... 29/603.01; 360/135
(58) Field of Classification Search .............. 29/603.01, 29/604; 360/135
See application file for complete search history.

(56) References Cited

U.S. PATENT DOCUMENTS

| 5,029,317 A | 7/1991 | Kawai et al. |
| 5,259,926 A | 11/1993 | Kuwabara et al. |
| 5,482,777 A | 1/1996 | Yamakawa et al. |
| 5,482,785 A | 1/1996 | Mahvan et al. |
| 5,512,131 A | 4/1996 | Kumar et al. |
| 5,537,282 A | 7/1996 | Treves et al. |
| 5,568,331 A | 10/1996 | Akagi et al. |
| 5,673,156 A | 9/1997 | Chen et al. |
| 5,738,906 A | 4/1998 | Momose et al. |
| 5,750,270 A | 5/1998 | Tang et al. |
| 5,772,905 A | 6/1998 | Chou |

(Continued)

FOREIGN PATENT DOCUMENTS

EP  0509361 A2  10/1992

(Continued)

OTHER PUBLICATIONS

White, "Patterned Media: A Viable Route to 50 Git/in² and Up for magnetic Recording?" Dept. of Electrical Engineering, Stanford University, Stanford, CA 94305, 1996.

(Continued)

*Primary Examiner*—A. Dexter Tugbang
*Assistant Examiner*—Livius R Cazan
(74) *Attorney, Agent, or Firm*—Blakely, Sokoloff, Taylor & Zafman LLP

(57) ABSTRACT

A method of forming a discrete track recording pattern in a magnetic recording disk. In one embodiment, the discrete track recording pattern may be formed in a NiP layer continuous throughout the discrete track recording pattern. Alternatively, the discrete track recording pattern may be formed in a substrate.

7 Claims, 10 Drawing Sheets

U.S. PATENT DOCUMENTS

| | | |
|---|---|---|
| 5,786,093 A | 7/1998 | Naruse et al. |
| 5,820,769 A | 10/1998 | Chou |
| 5,828,536 A | 10/1998 | Morita |
| 5,940,250 A | 8/1999 | McNeil et al. |
| 5,956,216 A | 9/1999 | Chou |
| 5,958,544 A | 9/1999 | Usuki |
| 5,995,309 A | 11/1999 | Suzuki et al. |
| 6,013,161 A | 1/2000 | Chen et al. |
| 6,103,339 A | 8/2000 | Lin et al. |
| 6,104,579 A | 8/2000 | Kamoshita et al. |
| 6,120,836 A | 9/2000 | Usuki |
| 6,123,603 A | 9/2000 | Tada et al. |
| 6,146,755 A * | 11/2000 | Guha et al. ............ 428/332 |
| 6,150,015 A | 11/2000 | Bertero et al. |
| 6,166,885 A | 12/2000 | Yamamoto et al. |
| 6,168,845 B1 | 1/2001 | Fontana et al. |
| 6,309,580 B1 | 10/2001 | Chou |
| 6,381,090 B1 | 4/2002 | Suzuki et al. |
| 6,391,213 B1 | 5/2002 | Homola |
| 6,406,611 B1 * | 6/2002 | Engelhaupt et al. ......... 205/259 |
| 6,426,155 B1 | 7/2002 | Tada et al. |
| 6,440,520 B1 | 8/2002 | Baglin et al. |
| 6,482,742 B1 | 11/2002 | Chou |
| 6,510,015 B2 | 1/2003 | Sacks et al. |
| 6,518,189 B1 | 2/2003 | Chou |
| 6,572,922 B1 | 6/2003 | Wang et al. |
| 6,594,103 B1 | 7/2003 | Despain et al. |
| 6,606,208 B2 | 8/2003 | Ishida et al. |
| 6,617,012 B1 | 9/2003 | Wang et al. |
| 6,622,907 B2 * | 9/2003 | Fanti et al. ............ 228/215 |
| 6,624,957 B1 | 9/2003 | Yun |
| 6,624,976 B2 | 9/2003 | Takino |
| 6,665,145 B2 | 12/2003 | Wada |
| 6,667,118 B1 | 12/2003 | Chang et al. |
| 6,703,099 B2 | 3/2004 | Belser |
| 6,713,197 B2 | 3/2004 | Nakamura et al. |
| 6,738,207 B1 | 5/2004 | Belser et al. |
| 6,748,865 B2 | 6/2004 | Sakurai et al. |
| RE38,544 E * | 7/2004 | Chen et al. ............ 204/192.2 |
| 6,814,898 B1 | 11/2004 | Deeman |
| 6,858,319 B2 | 2/2005 | Yasui et al. |
| 6,999,279 B2 | 2/2006 | Lundstrom |
| 7,019,924 B2 | 3/2006 | McNeil et al. |
| 7,147,790 B2 | 12/2006 | Wachenschwanz |
| 7,225,528 B2 | 6/2007 | Suwa et al. |
| 7,394,622 B2 | 7/2008 | Gage et al. |
| 2001/0053051 A1 | 12/2001 | Umehara et al. |
| 2002/0042027 A1 | 4/2002 | Chou |
| 2002/0071214 A1 | 6/2002 | Belser |
| 2002/0086184 A1 | 7/2002 | Wu et al. |
| 2002/0132482 A1 | 9/2002 | Chou |
| 2002/0135939 A1 | 9/2002 | Wada |
| 2002/0136927 A1 | 9/2002 | Hieda et al. |
| 2002/0164262 A1 | 11/2002 | Engelhaupt et al. |
| 2002/0167117 A1 | 11/2002 | Chou |
| 2002/0177319 A1 | 11/2002 | Chou |
| 2002/0186506 A1 | 12/2002 | Sato |
| 2002/0187295 A1 | 12/2002 | Nishikawa et al. |
| 2003/0022024 A1 | 1/2003 | Wachenschwanz |
| 2003/0034329 A1 | 2/2003 | Chou |
| 2003/0064251 A1 | 4/2003 | Uwazumi |
| 2003/0080471 A1 | 5/2003 | Chou |
| 2003/0080472 A1 | 5/2003 | Chou |
| 2003/0162057 A1 | 8/2003 | Matsunuma et al. |
| 2003/0170995 A1 | 9/2003 | Chou |
| 2003/0170996 A1 | 9/2003 | Chou |
| 2003/0179481 A1 | 9/2003 | McNeil et al. |
| 2004/0058197 A1 | 3/2004 | Nakamura et al. |
| 2004/0072036 A1 | 4/2004 | Kubota et al. |
| 2004/0101713 A1 | 5/2004 | Wachenschwanz |
| 2004/0224119 A1 | 11/2004 | Yamakage et al. |
| 2004/0265570 A1 | 12/2004 | Takahashi et al. |
| 2005/0036223 A1 | 2/2005 | Wachenschwanz |
| 2005/0120545 A1 | 6/2005 | Wachenschwanz |
| 2005/0249984 A1 | 11/2005 | Ohmori |
| 2006/0006135 A1 | 1/2006 | Homola et al. |
| 2006/0093863 A1 | 5/2006 | Tsuchiya et al. |
| 2006/0289382 A1 | 12/2006 | Kikitsu et al. |
| 2007/0041306 A1 | 2/2007 | Wachenschwanz et al. |

FOREIGN PATENT DOCUMENTS

| | | |
|---|---|---|
| EP | 1258866 | 11/2002 |
| JP | 63-048610 A1 | 3/1988 |
| JP | 02-023517 A | 1/1990 |
| JP | 03-142702 | 6/1991 |
| JP | 03-142707 | 6/1991 |
| JP | 06-318302 | 11/1994 |
| JP | 10-149539 A | 6/1998 |
| JP | 2000099942 A * | 4/2000 |
| WO | WO 00/48172 A2 | 8/2000 |

OTHER PUBLICATIONS

Tohge et al., "Patterning On Glass Substrates By The Sol-Gel Method", Journal of Non-Crystalline Solids 100:501-503, 1988.

S.E. Lambert et al., "Beyond Discrete Tracks: Other Aspects of Patterned Media", Journal of Applied Physics, Proceedings of the Thirty-Fifth Annual Conference on Magnetism and Magnetic Materials, Apr. 15, 1991, p. 4724-4727.

D.J. Twisselmann et al. "In-Plane Anisotropy in CoCr(Ta,Pt)/Cr Films Deposited Onto Substrates with Controlled Topography", Mat. Res. Soc. Symp. Proc. vol. 517, 1998 Materials Research Society, p. 193-198.

Noboru Tohge et al. "Fine-Patterning On Glass Substrates by the Sol-Gel Method", Journal of Non-Crystalline Solids, Proceedings of the Fourth International Workshop on Glasses and Glass Ceramics from Gels, Jul. 13-15, 1987, p. 501-505.

Merriam Webster's Collegiate Dictionary, 10$^{th}$ edition, 1997, title page, copyright page, p. 999.

Japanese Patent Application No. 2002-285575, English Translation of Notice of the Reasons for Refusal, dated Oct. 31, 2006, 3 pages.

Malaysian Search Report, Application No. PI20033891, dated Apr. 19, 2007, 1 page.

Japanese Patent Application No. 2002-285575, English Translation of the Final Decision of Rejection, dated Jun. 19, 2007, 3 pages.

Examination Report dated Oct. 31, 2008 from Malaysia Patent Application No. PI 20034044, 6 pages.

* cited by examiner

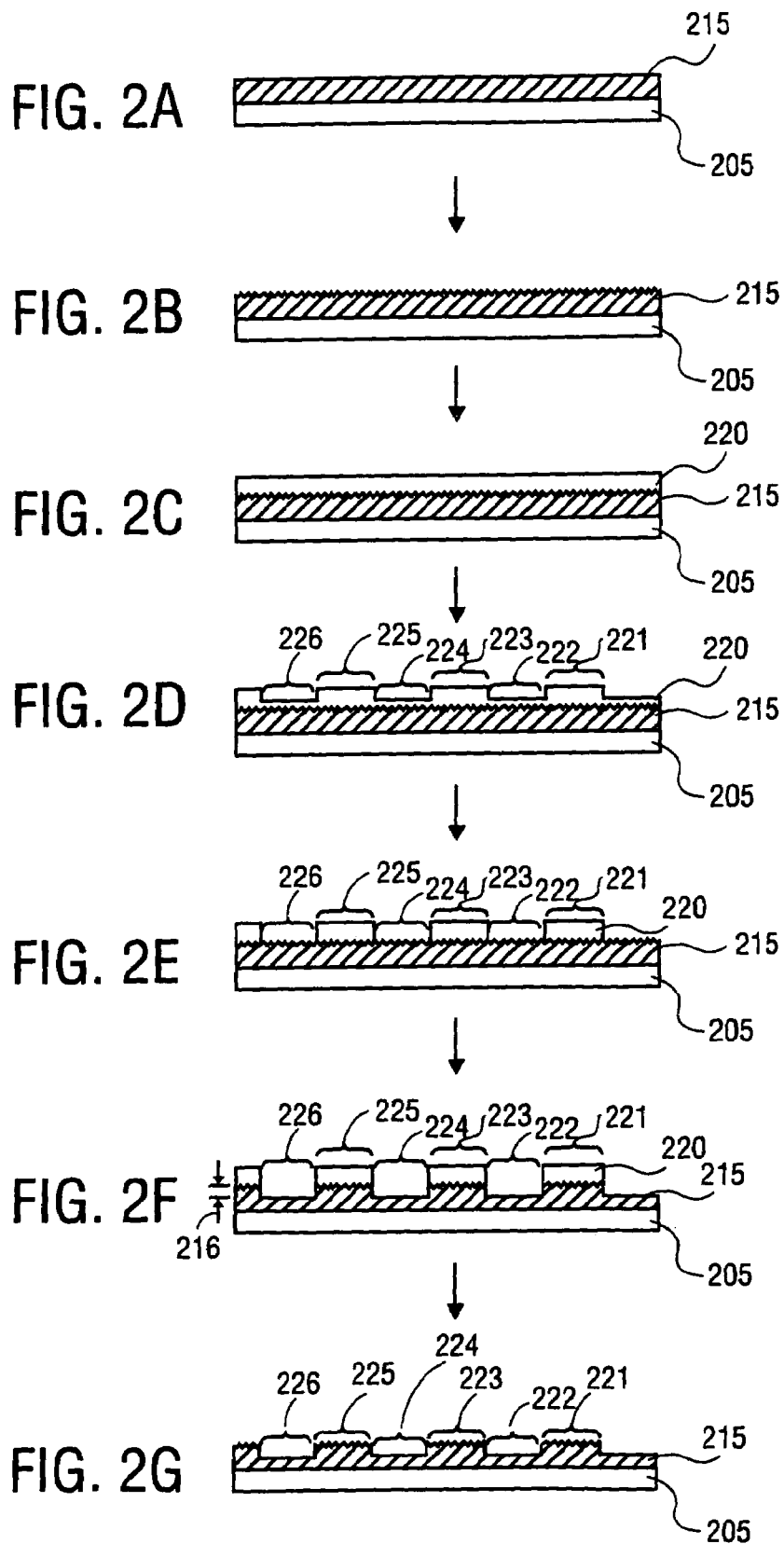

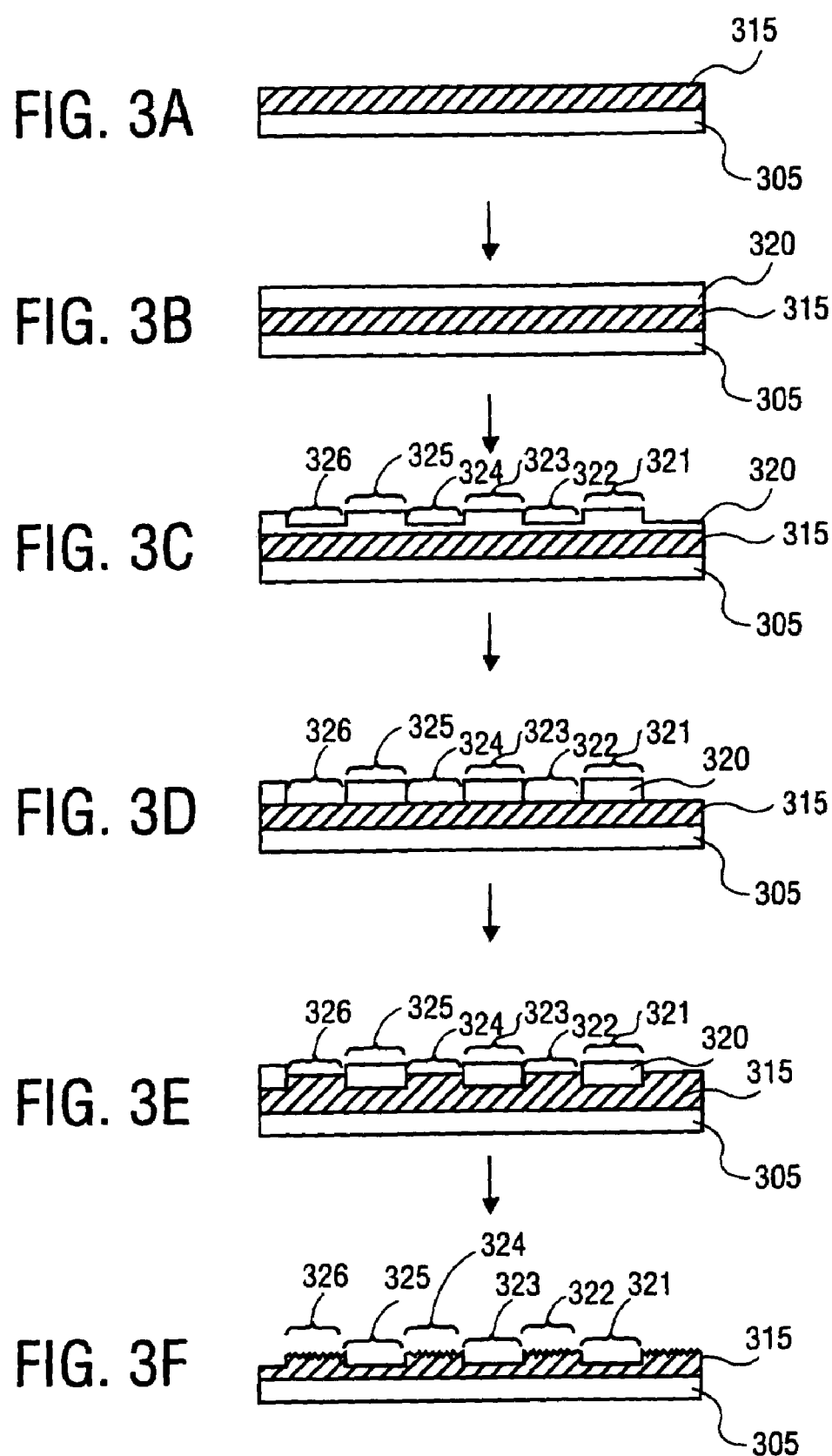

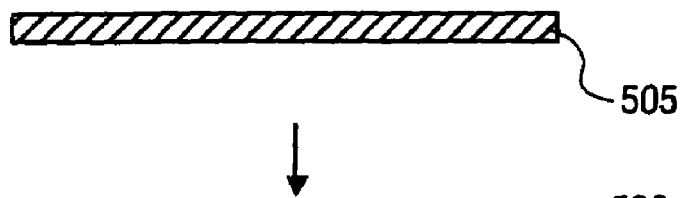
FIG. 5A
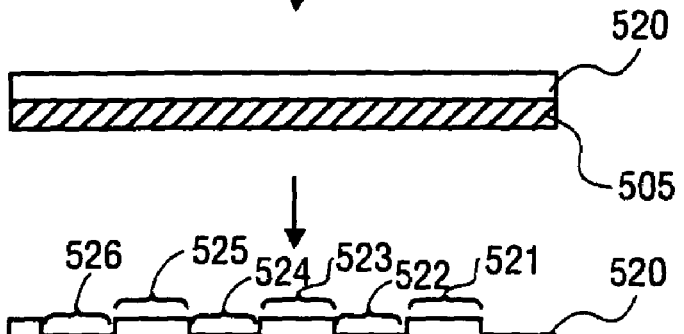
FIG. 5B
FIG. 5C
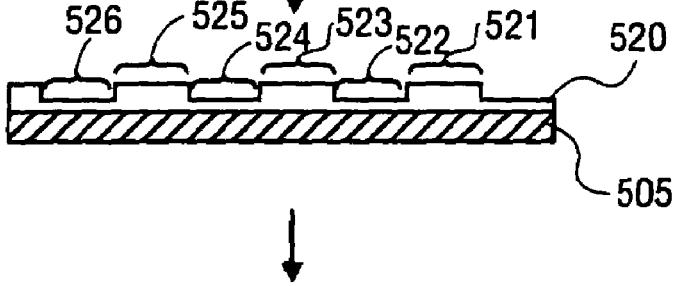
FIG. 5D
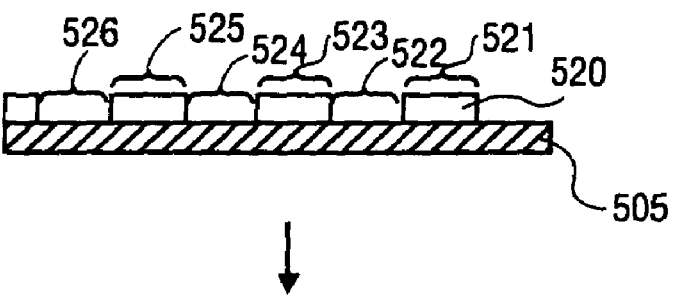
FIG. 5E
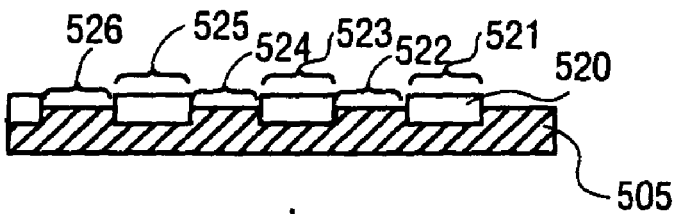
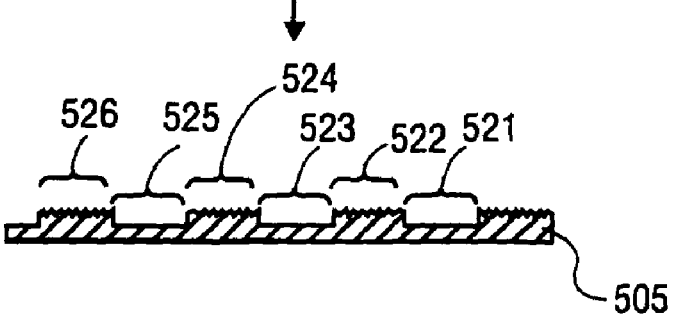
FIG. 5F

METHOD OF FABRICATING A MAGNETIC DISCRETE TRACK RECORDING DISK

REFERENCE TO RELATED APPLICATION

This application is a divisional of application Ser. No. 10/306,182 filed Nov. 27, 2002, now abandoned.

TECHNICAL FIELD

Embodiments of this invention relate to the field of disk drives and, more specifically, to disks used in disk drive systems.

BACKGROUND

A disk drive system includes one or more magnetic recording disks and control mechanisms for storing data on the disks. The disks are constructed of a substrate, that may be textured, and multiple film layers. In most systems, an aluminum-based substrate is used. However, alternative substrate materials such as glass have various performance benefits such that it may be desirable to use a glass substrate. One of the film layers on a disk is a magnetic layer used to store data. The reading and writing of data is accomplished by flying a read-write head over the disk to alter the properties of the disk's magnetic layer. The read-write head is typically a part of or affixed to a larger body that flies over the disk, referred to as a slider.

The trend in the design of magnetic hard disk drives is to increase the recording density of a disk drive system. Recording density is a measure of the amount of data that may be stored in a given area of a disk. To increase recording density, for example, head technology has migrated from ferrite heads to film heads and later to magneto-resistive (MR) heads and giant magneto-resistive (GMR) heads.

Achieving higher areal density (i.e., the number of stored bits per unit surface area) requires that the data tracks be close to each other. Also, because the track widths are very small, any misregistration of a track (e.g., thermal expansion) may affect the writing and/or reading with the head by an adjacent track. This behavior is commonly referred to as adjacent track interference (ATI). One method for addressing ATI is to pattern the surface of the disk to form discrete data tracks, referred to as discrete track recording (DTR). DTR disks typically have a series of concentric raised zones (also known as hills, lands, elevations, etc.) for storing data and recessed zones (also known as troughs, valleys, grooves, etc.) that provide inter-track isolation to reduce noise. By putting voids between tracks, reading and/or writing by a head may be accomplished more easily. Such recessed zones may also store servo information. The recessed zones separate the raised zones from one another to inhibit or prevent the unintended storage of data in the recessed zones.

One problem with prior DTR magnetic recording disks is that they may not have a desired "preferred" circumferential orientation of magnetic material in their magnetic recording films. "Preferred" circumferential orientation of the magnetic media aids in achieving optimal signal-to-noise ratio (SNR) and resolution to obtain the best possible performance from the magnetic media.

BRIEF DESCRIPTION OF THE DRAWINGS

The present invention is illustrated by way of example, and not limitation, in the figures of the accompanying drawings in which:

FIGS. 2A-2G show expanded cross sectional views illustrating an exemplary embodiment of a method of forming a discrete track recording pattern on a nickel-phosphorus layer.

FIGS. 3A-3F show expanded cross sectional views illustrating another exemplary embodiment of a method of forming a discrete track recording pattern on a nickel-phosphorus layer.

FIGS. 5A-5F show expanded cross sectional views illustrating another exemplary embodiment of a method of forming a discrete track recording pattern on a substrate.

DETAILED DESCRIPTION

In the following description, numerous specific details are set forth such as examples of specific materials or components in order to provide a thorough understanding of the present invention. It will be apparent, however, to one skilled in the art that these specific details need not be employed to practice the invention. In other instances, well known components or methods have not been described in detail in order to avoid unnecessarily obscuring the present invention.

The terms "above," "below," and "between" as used herein refer to a relative position of one layer with respect to other layers. As such, one layer deposited or disposed above or below another layer may be directly in contact with the other layer or may have one or more intervening layers. Moreover, one layer deposited or disposed between layers may be directly in contact with the layers or may have one or more intervening layers.

It should be noted that the apparatus and methods discussed herein may be used with various types of disks. In one embodiment, for example, the apparatus and methods discussed herein may be used with a magnetic recording disk. Alternatively, the apparatus and methods discussed herein may be used with other types of digital recording disks, for example, optical recording disks such as a compact disc (CD) and a digital-versatile-disk (DVD).

In one embodiment, a longitudinal magnetic recording disk having a nickel-phosphorus (NiP) underlayer with a discrete track recording pattern is described. The discrete track recording pattern provides inter-track isolation within the NiP layer. The recording disk has a substrate, a NiP layer disposed above the substrate and a magnetic recording layer disposed above the NiP layer. In another embodiment, methods for patterning a NiP layer with a discrete track recording pattern are described. The NiP layer, continuous throughout the discrete track recording pattern, may initially be imprinted with a stamper that forms an intermediate pattern relative the final discrete track recording pattern. In an alternative embodiment, a method of forming the discrete track recording pattern involves etching (e.g., plasma, e-beam, chemical) the NiP layer in which portions of the NiP layer are removed to form the raised and recessed zones (e.g., data and non-data zones of a DTR pattern). In another embodiment, an additive process may be used in which a material compatible with the NiP layer may be plated up on the NiP layer to form the discrete track recording pattern. In one embodiment, the discrete track recording pattern does not extend down into the disk substrate.

In an alternative embodiment, a discrete track recording pattern is formed in the substrate. The patterned substrate may be formed analogous to the subtractive or additive process for patterning the NiP layer.

Figure 1A:
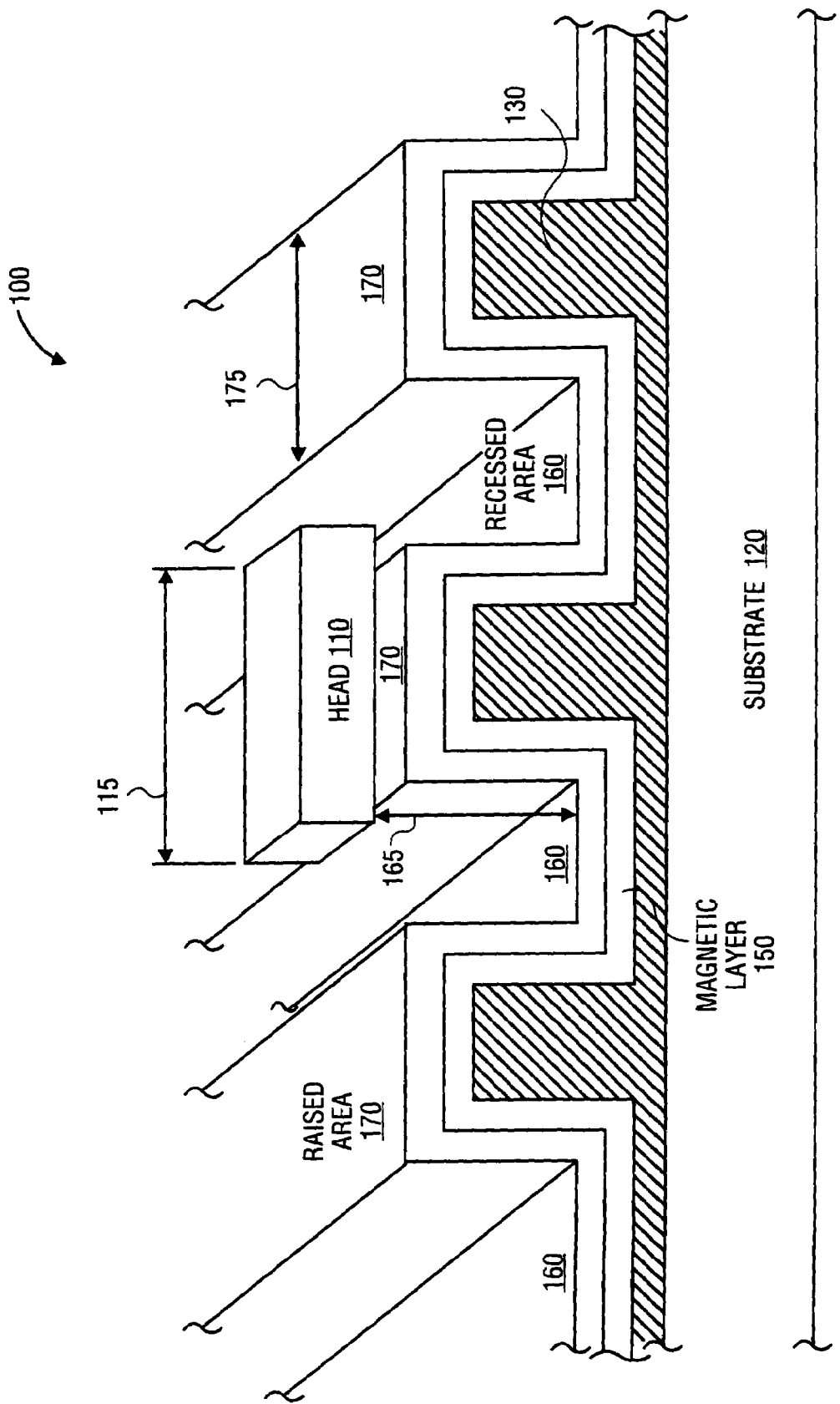
FIG. 1A illustrates a cross-sectional perspective view of one embodiment of a patterned disk and a write element of a head.

Although a discussion of the operation of a disk drive system is not strictly necessary for the present invention, a description thereof may aid in understanding the operation and advantages provided by a disk having a discrete track recording pattern. FIG. 1A illustrates a cross-sectional perspective view of a patterned disk and a write element of a head. The disk 100 includes multiple film layers that have been omitted for clarity of the following discussion. During operation of a disk drive, reading and writing of data on the disk 100 is accomplished by flying, for example, a read-write head 110 over the disk 100 to alter the properties of the disk's magnetic layer 150. To perform a transfer of data with the disk 100, the head 110 is centered above a track of the rotating disk 100. The recording head 110 may be, for example, a dual element head having a read element for performing a read operation and a write element for performing a write operation.

The disk 100 includes a substrate 120 that may be textured, and multiple film layers disposed above the substrate 120. The disks described herein may be manufactured with, by example, a glass substrate or a metal/metal alloy substrate. Glass substrates that may be used include, for example, a silica containing glass such as borosilicate glass and aluminosilicate glass. Metal alloy substrates that may be used include, for example, aluminum-magnesium (AlMg) substrates. In an alternative embodiment, other substrate materials including polymers and ceramics may be used.

The multiple film layers include a NiP layer 130 and magnetic layer 150. A discrete track recording pattern is formed into the NiP layer 130 as discussed further below. A magnetic layer 150 is disposed above the NiP layer 130. The DTR pattern includes recessed zones 160 and raised zones 170. The recessed zones 160 have a depth 165 relative to the recording head 110 and/or raised zones 170. In one embodiment, the width 115 of the head 110 is greater than the width 175 of the raised zones 170 such that portions of the head 110 extend over the recessed zones 160 during operation. However, the recessed zones 160 are sufficiently separated by a distance 165 from the head 110 to inhibit storage of data by the head 110 in the magnetic layer 150 directly below the recessed zones 160. The raised zones 170 are sufficiently close to the head 110 to enable the writing of data in the magnetic layer 150 directly below the raised zones 170. In one embodiment, for example, a width 175 of each raised zone may be about 1250 angstroms (Å) and a width of each recessed zone may be typically about ⅓ of the raised zone, or about 400 Å. A depth 165 of each recessed zone, for example, may be about 400 Å. In other embodiments, the raised and recessed zones may have a pitch between about 200-2000 Å. Dimensions discussed above are exemplary and may have other values.

Therefore, when data are written to the recoding medium, the raised zones 170 of NiP layer 130 correspond to the data tracks. Information, such as servo (head positioning) information may be stored in the recessed zones 160. Alternatively, servo information may be interleaved with data in sectors on stored on the raised zones 170. The raised zones 170 and recessed zones 160 are typically formed as alternating concentric circles although other configurations (e.g., spiral) are contemplated. The recessed zones 160 isolate the raised zones 170 (e.g., the data tracks) from one another, resulting in data tracks that are defined both physically and magnetically.

When data are written by the head 110 to a particular data track (raised area or zone), data are inhibited from being to adjacent recessed zones 160 because the magnetic layer 150, below the recessed surface zone 160, is too far from the head 110 for the head 110 to induce magnetic transitions there. If new data are written on a subsequent write operation, there should be no residual data from an earlier operation in the raised zones 170 or recessed zones 160. Thus, when the head 110 reads data from a raised zone 170, only data from the preceding write operation is present and read.

Figure 1B:
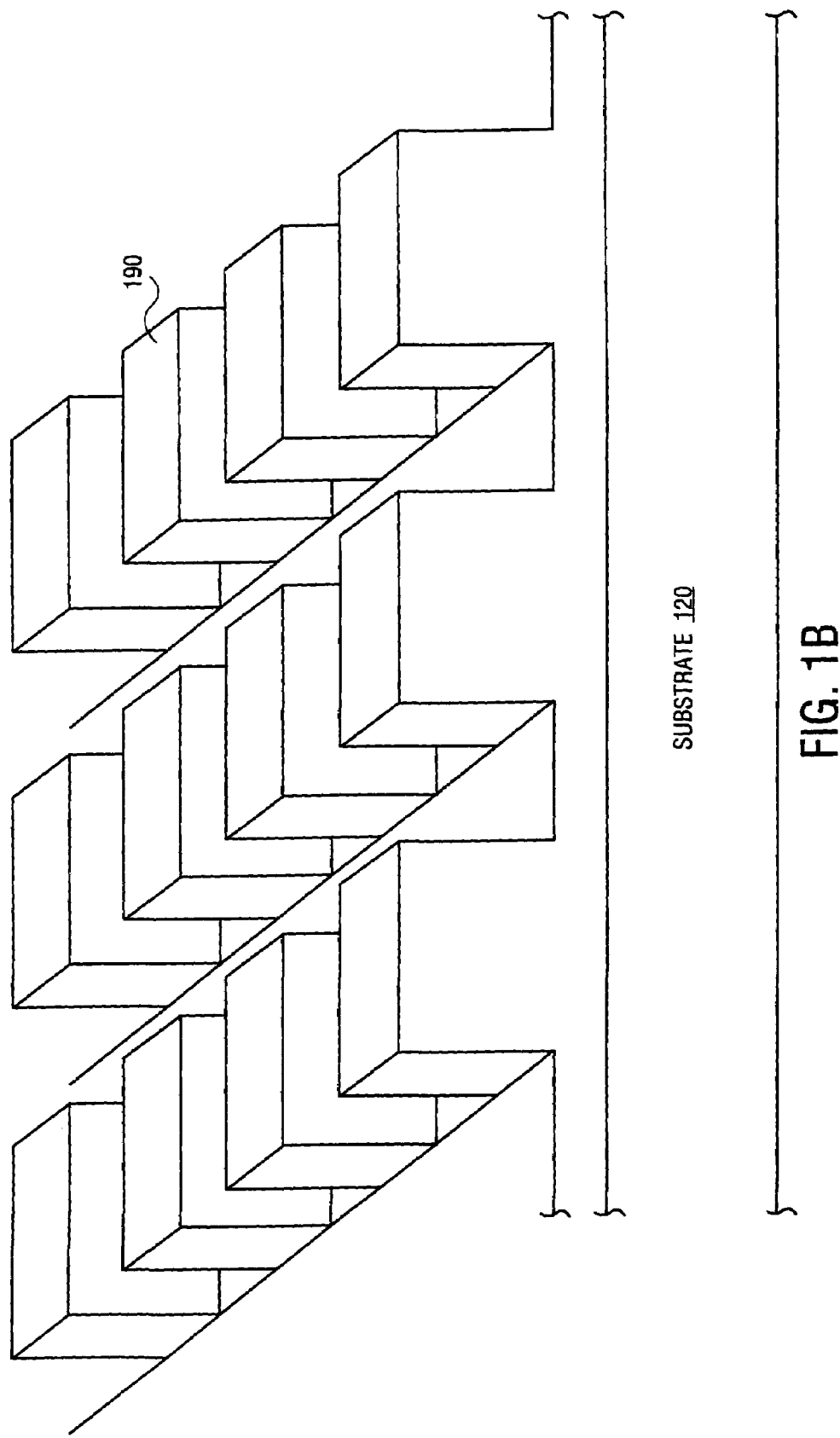
FIG. 1B illustrates a cross-sectional perspective view of an alternative embodiment of a patterned disk.

It should be noted that various types of discrete track patterns may be generated by stampers in addition to what is illustrated in FIG. 1A. For example, in an alternative embodiment, the discrete track pattern formed in the NiP layer 130 may include data islands as illustrated in FIG. 1B. Each of the data islands 190 may hold a block of data (e.g., one bit or multiple bits) and are isolated form one another by the recessed zones. Such a configuration may reduce the amount of noise (e.g., noise between tracks and between blocks of data or bits) that is sensed by the read head 110. In other examples, the recessed and raised zones may have alternate shapes that still isolate data blocks from recessed zones.

A method to form a continuous NiP layer with a discrete track recording pattern is described. The method may involve first imprinting an embossable layer disposed above the NiP layer followed by a subtractive or additive process to form the desired pattern. Imprinting the embossable layer may utilize lithography techniques, for example, nanoimprint lithography.

FIGS. 2A-2G show expanded cross sectional views illustrating one embodiment of forming a discrete track recording pattern on a NiP layer of a longitudinal magnetic recording disk. In this embodiment, the method involves a subtractive process in which a layer or layers disposed on a disk substrate may be removed (e.g., through imprint lithography and etching) to expose a desired pattern on the NiP layer. For clarity of explanation, the various layers illustrated in FIGS. 2A-2G are exemplary and may not be scaled to representative sizes. As shown in FIG. 2A, the patterning process begins with a disk-shaped substrate 205. Disk substrate 205, as discussed above, may be made of a number of materials including metals (e.g., aluminum), glass, silicon or other conventional disk substrate materials known in the art. In one embodiment, substrate 205 may be plated with a NiP layer 215. NiP layer 215 may be formed by electroplating, electroless plating, or by other methods known in the art. Plating disk substrate 205 with a rigid or metallic material such as NiP provides mechanical support to disk substrate 205 for subsequent texturing, polishing, and/or patterning processes. Plating of disk substrate 205 may not be necessary, however, if disk substrate 205 is composed of a sufficiently rigid or hard material such as glass.

The NiP plated disk substrate 205 surface may then be polished, planarized, and/or textured as illustrated by FIG. 2B. In one embodiment, NiP layer 215 may be polished, for example, by a uniform etch. In alternative embodiments, other polishing techniques may be used. Polishing techniques are well known in the art; accordingly, a detailed discussion is not provided. Alternatively, NiP layer 215 may not be polished. Next, in one embodiment, NiP layer 215 may be anisotropically textured with a pattern (e.g., cross-hatch, circumferential), by various methods such as mechanical texturing using fixed or free abrasive particles (e.g., diamond). Alternatively, other types of texturing methods, such as laser texturing, may be used. Certain types of texturing, on the intended data zones of a disk, before deposition of nucleation and magnetic layer may encourage preferred circumferential orientation of the magnetic media on a disk. Preferred circumferential orientation of the magnetic media on a disk aids in achieving optimal signal-to-noise (SNR) and resolution to obtain the best possible performance from the magnetic media. Alternatively, as discussed below, texturing of NiP layer 215 may be performed after the discrete track recording pattern has been formed.

Next, as illustrated by FIG. 2C, disk substrate 205 may then be coated with an embossable layer 220, for example, a photoresist, an electron sensitive resist, or other embossable materials. Spin coating, dip coating, and spray coating are just some methods of disposing embossable layer 220 on NiP layer 215. Other coating methods such as sputtering and vacuum deposition (e.g., CVD) may be used. Other embossable layer materials such as dye polymer may be used for other examples, thermoplastics (e.g., amorphous, semi-crystalline, crystalline), thermosetting (e.g., epoxies, phenolics, polysiloxanes, ormosils, sol-gel) and radiation curable (e.g., UV curable, electron-beam curable) polymers. In one embodiment, for example, embossable layer 220 may have a thickness in the range of about 100-5000 Å. Embossable layer 220 may also be referred to as a "masking layer" and a "stencil layer."

Next, as illustrated by FIG. 2D, embossable layer 220 is imprinted with a pattern of recessed (222, 224, 226) and raised (221, 223, 225) zones. The stamping of embossable layer 220 may utilize, for example, nanoimprint lithography techniques that are well known in the art. In one embodiment, a stamper (not shown) bearing a discrete track recording pattern, may be used to imprint embossable layer 220 to form recessed zones (222, 224, 226) and raised zones (221, 223, 225). Because of the thickness of the embossable layer 220, the imprint of raised and recessed zones are not likely to press into NiP layer 215. Alternatively, if embossable layer 220 is relatively thin, it may be stamped to leave very little embossable material in the recessed zones (222, 224, 226). Subsequently, embossable material in the recessed zones (222, 224, 226) may be removed to expose NiP layer 215. The stamper used to pattern the embossable layer 220 has the inverse, or negative replica, of the desired pattern (i.e., the discrete track recording pattern on NiP layer 215) to be formed.

Next, as illustrated by FIG. 2E, the intermediate pattern in embossable layer 220 may be etched to further define the alternating recessed zones (222, 224, 226) and raised zones (221, 223, 225) that form the basis for the discrete track recording pattern on NiP layer 215. In one embodiment, a series, or step-wise process of etching procedures may be performed on embossable layer 220 and NiP layer 215 to form the desired track pattern. Embossable layer 220 serves as a stencil that exposes the NiP layer 215 in areas beneath the recessed zones (222, 224, 226) of the pattern formed by the stamper. In one embodiment, plasma etching is utilized to remove embossable layer 220 material in recessed zones (222, 224, 226) down to the NiP layer 215. Alternatively, other etching methods may be used to remove embossable layer 220 material in at least the recessed zones, for example, using chemical etching, electron beam (e-beam) etching, ion-beam etching (passive or reactive) sputter etching, and plasma etching with reactive gases. For certain types of etching (e.g., chemical), embossable layer material may be removed from both the raised zones (221, 223, 225) and recessed zones (222, 224, 226) at approximately a similar rate. Chemical etching will remove the embossable layer 220 in both the recessed zones (222, 224, 226) and raised zones (221, 223, 225) until NiP layer 215 is exposed in the recessed zones (222, 224, 226), as illustrated by FIG. 2E.

Next, as illustrated by FIG. 2F, recessed zones (222, 224, 226) of NiP layer 215 may be further etched (e.g., by chemical, e-beam, ion-beam, and sputter etching). In one embodiment, the etching of recessed zones (222, 224, 226) may not penetrate through NiP layer 215 to the disk substrate 205 such that NiP layer 215 forms a continuous pattern of recessed zones (222, 224, 226) and raised zones (221, 223, 225). Having achieved a desired recess depth 216, the remaining embossable layer 220 on the raised zones (221, 223, 225) of the discrete track recording pattern may then be removed, for example, by the methods discussed above in relation to FIG. 2E, or by other methods such as polishing (e.g., fine, kiss, or coarse polishing). The removal of embossable layer 220 exposes the entire top surface of the patterned NiP layer 215, as illustrated by FIG. 2G.

It is noted that the raised zones (221, 223, 225), corresponding to the data recording zones of the magnetic disk may be textured, rather than texturing the entire NiP layer 215 prior to coating with embossable layer 220 as discussed above in relation to FIG. 2B. Any of the texturing methods described above may be used (e.g., mechanical and laser texturing). As discussed above, NiP layer 215 may be textured earlier before any imprinting or etching (e.g., as described with respect to FIG. 2B, after NiP plating of disk substrate 205). It should also be noted that various cleaning and/or polishing operations may be performed between the stages discussed above. For example, one or more polishing operations (e.g., fine/kiss, coarse) may be performed to remove asperities from the surface of one or more of the layers. Asperities residing on the surface of any layer may have negative effects on the performance of the manufactured disk. With NiP layer 215 now patterned and textured with a discrete track recording pattern, other layers (e.g., a magnetic layer, lamination layer) may be disposed above NiP layer 215 to complete the disk manufacturing process.

FIGS. 3A-3F show expanded cross sectional views illustrating an alternative embodiment of forming a discrete track recording pattern on a NiP layer of a longitudinal magnetic recording disk. This method involves an additive process in which a material compatible or identical to material forming the initial NiP layer is added or plated to form the raised zones of the discrete track recording pattern. The various layers illustrated in FIGS. 3A-3F are exemplary and not scaled to proper sizes so that the process of patterning the NiP layer may be described with clarity.

The additive process illustrated by FIGS. 3A-3F are analogous to the subtractive process illustrated by FIGS. 2A-2G with respect to the stamping and etching of the embossable layer 320 disposed above NiP layer 315. As illustrated by FIG. 3A, the process begins with NiP layer 315 disposed on disk substrate 305 (e.g., by electro plating and electroless plating). Unlike the subtractive process described above, the NiP plated disk substrate 305 is not necessarily textured at this point. As will be apparent below, this method requires texturing of the final raised zones of NiP layer 315 after the discrete track recording pattern is formed. Disk substrate 305, may be composed of materials similar to those discussed above with respect to the substrate 205.

As illustrated by FIG. 3B, disk substrate 305 may then be coated with an embossable layer 320, for example, a photoresist, an electron sensitive resist, or other embossable materials. Spin coating, dip coating, and spray coating are just some methods of disposing the embossable layer 320 on substrate 305. Other coating methods (e.g., sputtering) and embossable layer materials (e.g., dye polymer) may be used for example, thermoplastics (e.g., amorphous, semi-crystalline, crystalline), thermosetting (e.g., epoxies, phenolics, polysiloxanes, ormosils, sol-gel) and radiation curable polymers (e.g., UV curable, electron-beam curable).

Next, as illustrated by FIG. 3C, a stamper (not shown) bearing a discrete track recording pattern, may be used to impress embossable layer 320 to form recessed zones (322, 324, 326) and raised zones (321, 323, 325). If the embossable layer 320 is thick relative to the depth of the pattern in the stamper, the imprint from the stamper is not likely to register deep enough to reach NiP layer 315. Alternatively, if embossable layer 320 is relatively thin, it may be stamped to leave very little embossable material in the recessed zones (322, 324, 326). Subsequently, embossable material in the recessed zones (322, 324, 326) may be removed to expose NiP layer 315. The stamper used to pattern the embossable layer 320 may have a pattern identical to the pattern to be formed on NiP layer 315.

Next, as illustrated by FIG. 3D, embossable layer material in the recessed zones (322, 324, 326) may be removed by a number of etching methods (e.g., by chemical, plasma, e-beam, ion-beam, or sputter etching), such that surface areas of NiP layer 315 are exposed. For certain types of etching (e.g., chemical), embossable layer material may be removed from both the raised zones (321, 323, 325) and recessed zones (322, 324, 326) at approximately a similar rate. Chemical etching will remove the embossable layer 320 in both the recessed zones (322, 324, 326) and raised zones (321, 323, 325) until NiP layer 315 is exposed in the recessed zones (322, 324, 326), as illustrated by FIG. 3D.

Next, as illustrated by FIG. 3E, recessed zones (322, 324, 326) may be plated or deposited (e.g., electroplating) with a material identical to or compatible with NiP layer 315, such that recessed zones (322, 324, 326) become filled to a level comparable to the top surface of raised zones (321, 323, 325). Then, as illustrated by FIG. 3F, the remaining segments of embossable layer 320 may be removed, for example, by chemical etching so that only NiP layer 315 remains. Upon removal of embossable layer 320, zones 322, 324, 326 that were once recessed zones are now raised zones that form the data zones of the NiP layer 315. Analogously, zones 321, 323, 325 that formed the raised zones (until plating recessed zones 322, 324, 326 at FIG. 3E) are now the recessed zones positioned between raised data zones 322, 324, 326 of the DTR pattern as illustrated by FIG. 3F.

In an alternative embodiment, raised zones 322, 324, 326 of FIG. 3F may be formed by first depositing a NiP material over the imprinted embossable layer 320 (e.g., at FIG. 3D) by various deposition methods such as chemical vapor deposition (CVD), sputtering, and ion beam deposition. Next, the embossable layer material may be selectively removed by any number of etching methods described herein (e.g., chemical etching). In doing so, any NiP material deposited above the embossable layer becomes "lifted off," resulting in the raised zones (322, 324, 326) and recessed zones (321, 323, 325) of FIG. 3F.

FIG. 3F shows the final raised zones (322, 324, 326) textured. Unlike the method described with respect to FIGS. 2A-2G, texturing NiP layer 315 prior to depositing embossable layer 320 would not preserve the textured areas in the final raised zones (322, 324, 326). The texturing methods described above may be used (e.g., mechanical and laser texturing). It should also be noted that various cleaning and/or polishing operations may be performed between the stages discussed above. For example, one or more polishing operations (e.g., fine/kiss, coarse) may be performed to remove asperities from the surface of one or more of the layers. With NiP layer 315 now patterned and textured with a discrete track recording pattern, other layers (e.g., a magnetic layer, lamination layer) may be disposed above NiP layer 315 to form a longitudinal or perpendicular magnetic recording disk.

The process of forming a discrete track recording pattern illustrated in FIGS. 2A-2G differs from the process illustrated and described in FIGS. 3A-3F in that the former forms the recessed zones of the NiP layer by etching into the NiP layer to remove material making up the NiP layer. The initial stamping of the embossable layer serves as a template corresponding to the raised and recessed zones. In the method described and illustrated by FIGS. 3A-3F, the initial recessed impressions formed by a stamper (e.g., recessed zones 322, 324, 326 shown in FIG. 3C) form what eventually becomes the raised data zones 322, 324, 326 (as shown in FIG. 3F). As such, the stamper utilized to form the impression shown in FIG. 3C may form wider recessed zones compared to the raised zones because ultimately, the recessed zones that become the raised data zones of the NiP layer should be wider than the recessed zones.

Figure 4A:
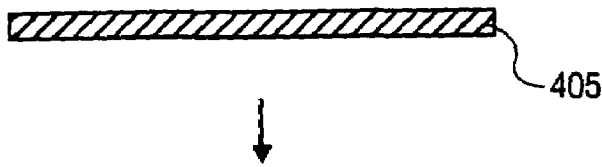
FIGS. 4A-4G show expanded cross sectional views illustrating an exemplary embodiment of a method of forming a discrete track recording pattern on a substrate.
Figure 4B:
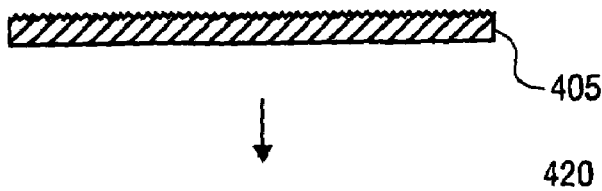

FIGS. 4A-4G show expanded cross sectional views illustrating an exemplary embodiment of a method of forming a discrete track recording pattern on a substrate for a magnetic recording disk. For clarity of explanation, the various layers illustrated in FIGS. 4A-4G are exemplary and may not be scaled to representative sizes. As discussed above, materials such as glass may be used for the disk's substrate. Substrate disks constructed of materials such as glass may not have a NiP plating because the material itself provides mechanical support for subsequent texturing, polishing, and/or patterning processes. With such substrates the discrete track recording pattern may be formed directly in the substrate. The method of forming the DTR pattern in a substrate may be analogous to the subtractive method discussed above with respect to FIGS. 2A-2G (i.e., for patterning a NiP layer). As shown in FIG. 4A, the patterning process begins with a disk-shaped (e.g., glass) substrate 405. Disk substrate 405 may then be polished and planarized. In one embodiment, disk substrate 405 may be polished, for example, by a uniform etch. In alternative embodiments, other polishing techniques may be used. Alternatively, disk substrate 405 may not be polished. Next, as illustrated in FIG. 4B, disk substrate 405 may be anisotropically textured with a pattern, by various methods as discussed above. Alternatively, as discussed below, texturing of disk substrate 405 may be performed after the discrete track recording pattern has been formed.

Figure 4C:
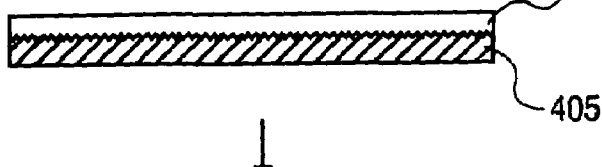

Next, as illustrated by FIG. 4C, disk substrate 405 may then be coated with an embossable layer 420, for example, with a photoresist, an electron sensitive resist, or other embossable materials. Spin coating, dip coating, and spray coating are just some methods of disposing the embossable layer 420 on substrate 405. Other coating methods and other embossable layer materials, as discussed above, may be used.

Figure 4D:
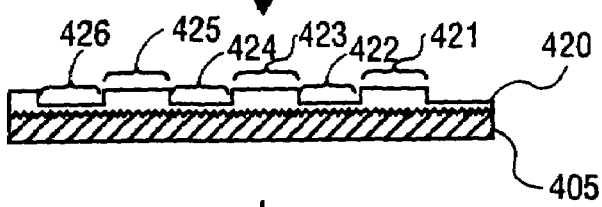

Next, as illustrated by FIG. 4D, embossable layer 420 is imprinted with a pattern of recessed zones (422, 424, 426) and raised zones (421, 423, 425). The stamping of embossable layer 420 may utilize, for example, nanoimprint lithography techniques that are well known in the art. In one embodiment, a stamper (not shown) bearing a discrete track recording pattern, may be used to imprint embossable layer 420 to form recessed zones (422, 424, 426) and raised zones (421, 423, 425). Because of the thickness of the embossable layer 420, the imprint of raised and recessed zones are not likely to press into substrate 405. The stamper used to pattern the embossable layer 420 has the inverse, or negative replica, of the desired pattern (i.e., the discrete track recording pattern on substrate 405) to be formed.

Figure 4E:
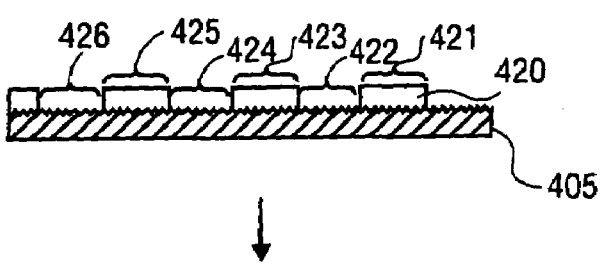

Next, as illustrated by FIG. 4E, embossable layer 420 may be etched to further define the alternating recessed zones (422, 424, 426) and raised zones (421, 423, 425) that form the basis for the discrete track recording pattern on substrate 405. In one embodiment, a series, or step-wise process of etching procedures may be performed on embossable layer 420 and substrate 405 to form the desired track pattern. Embossable layer 420 serves as a stencil to expose the substrate 405 in areas beneath the recessed zones (422, 424, 426) of the pattern formed by the stamper. In one embodiment, plasma etching is utilized to remove embossable layer 420 material in recessed zones (422, 424, 426) down to the substrate 405. Alternatively, other etching methods may be used to remove embossable layer 420 material in at least the recessed zones, for examples, chemical etching, electron beam (e-beam) etching, ion-beam etching (passive or reactive), sputter etching, and plasma etching with reactive gases. For certain types of etching (e.g., chemical), embossable layer material may be removed from both the raised zones (421, 423, 425) and recessed zones (422, 424, 426) at approximately a similar rate. Chemical etching will remove the embossable layer 420 in both the recessed zones (422, 424, 426) and raised zones (421, 423, 425) until substrate 405 is exposed in the recessed zones (422, 424, 426), as illustrated by FIG. 4E.

Figure 4F:
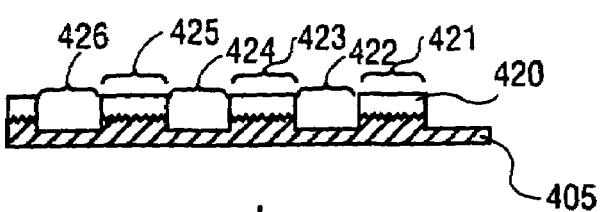
Figure 4G:
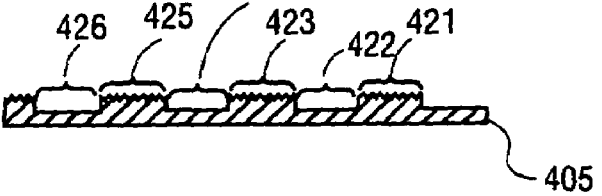

Next, as illustrated by FIG. 4F, recessed zones (422, 424, 426) of substrate 405 may be further etched (e.g., by chemical, e-beam, ion-beam, and sputter etching). In one embodiment, the etching of recessed zones (422, 424, 426) may not penetrate completely through substrate 405 such that substrate 405 forms a continuous pattern of recessed zones (422, 424, 426) and raised zones (421, 423, 425). Having achieved a desired recess depth, the remaining embossable layer 420 on the raised zones (421, 423, 425) of the discrete track recording pattern may then be removed, for example, by the methods discussed above in relation to FIG. 4E. The removal of embossable layer 420 exposes the entire top surface of substrate 405, as illustrated by FIG. 4G.

It is noted that raised zones (421, 423, 425), corresponding to the data recording zones of the magnetic disk may be textured at this stage, rather than texturing the entire substrate 405 prior to coating with embossable layer 420 as discussed above in relation to FIG. 4B. The texturing methods described above may be used (e.g., mechanical and laser texturing). As discussed above, substrate 405 may be textured before any imprinting or etching (e.g., as described with respect to FIG. 4B). As previously noted, various cleaning and/or polishing operations may be performed between the various stages. With substrate 405 now patterned and textured with a discrete track recording pattern, layers (e.g., a magnetic layer) may be disposed above substrate 405 to form a longitudinal or perpendicular magnetic recording disk.

FIGS. 5A-5F show expanded cross sectional views illustrating an alternative embodiment of forming a discrete track recording pattern on a substrate of a magnetic recording disk. This method involves an additive process in which a material compatible or identical to material forming the substrate is added or plated to form the raised zones of the discrete track recording pattern. The various layers illustrated in FIGS. 5A-5F are exemplary and not scaled to proper sizes so that the process of patterning the substrate may be described with clarity.

The additive process illustrated by FIGS. 5A-5F is analogous to the subtractive process illustrated by FIGS. 4A-4G with respect to the stamping and etching of the embossable layer 520 disposed above substrate 505. As illustrated by FIG. 5A, the process begins with substrate 505. Unlike the subtractive process described above, substrate 505 is not necessarily textured at this point. As will be apparent below, this method requires texturing of the final raised zones of substrate 505 after the discrete track recording pattern is formed As illustrated by FIG. 5B, disk substrate 505 may then be coated with an embossable layer 520, for example, with a photoresist, an electron sensitive resist, or other embossable materials. Spin coating, dip coating, and spray coating are just some methods of disposing the embossable layer 520 on substrate 505. Other coating methods and embossable layer materials may be used as discussed above. Next, as illustrated by FIG. 5C, a stamper (not shown) bearing a discrete track recording pattern, may be used to impress embossable layer 520 to form recessed zones (522, 524, 526) and raised zones (521, 523, 525). If the embossable layer 520 is thick relative to the depth of the pattern in the stamper, the imprint from the stamper is not likely to register deep enough to reach substrate 505. Alternatively, if embossable layer 520 is relatively thin, it may be stamped to leave very little embossable material in the recessed zones (522, 524, 526). Subsequently, embossable material in the recessed zones (522, 524, 526) may be removed to expose substrate 505. The stamper used to pattern the embossable layer 520 may have a pattern identical to the pattern to be formed on substrate 505.

Next, as illustrated by FIG. 5D, embossable layer material in the recessed zones (522, 524, 526) may be removed by a number of etching methods (e.g., by chemical, plasma, e-beam, ion-beam, or sputter etching), such that surface areas of substrate 505 are exposed. For certain types of etching (e.g., chemical), embossable layer material may be removed from both the raised zones (521, 523, 525) and recessed zones (522, 524, 526) at approximately a similar rate. Chemical etching will remove the embossable layer 520 in both the recessed zones (522, 524, 526) and raised zones (521, 523, 525) until substrate 505 is exposed in the recessed zones (522, 524, 526), as illustrated by FIG. 5D.

Next, as illustrated by FIG. 5E, recessed zones (522, 524, 526) may be plated (e.g., electroplating or electroless plating) with a material identical to or compatible with substrate 505, such that recessed zones (522, 524, 526) become filled to a level comparable to the top surface of raised zones (521, 523, 525). Then, as illustrated by FIG. 5F, the remaining segments of embossable layer 520 may be removed, for example, by chemical etching so that only substrate 505 remains. Upon removal of embossable layer 520, zones 522, 524, 526 that were once recessed zones are now raised zones that form the data zones of substrate 505. Analogously, zones 521, 523, 525 that formed the raised zones (until plating recessed zones 522, 524, 526 at FIG. 5E) are now the recessed zones positioned between raised data zones 522, 524, 526 of the DTR pattern, as illustrated by FIG. 5F.

In an alternative embodiment, raised zones (522, 524, 526) of FIG. 5F may be formed by first depositing a substrate material over the imprinted embossable layer 520 (e.g., at FIG. 5D) by various deposition methods as discussed above. Next, the substrate material may be selectively removed by any number of etching methods described herein (e.g., plasma etching). In doing so, any substrate material deposited above the embossable layer becomes "lifted off," resulting in the raised zones (522, 524, 526) and recessed zones (521, 523, 525) of FIG. 5F.

FIG. 5F shows the final raised zones (522, 524, 526) textured. Unlike the method described with respect to FIGS. 4A-4G, texturing substrate 505 prior to depositing embossable layer 520 would not preserve the textured areas in the final raised zones (522, 524, 526). The texturing methods described above may be used. As also previously noted, various cleaning and/or polishing operations may be performed between the stages. With substrate 505 now patterned and textured with a discrete track recording pattern, other layers (e.g., a magnetic layer, lamination layer) may be disposed above substrate 505 to form a longitudinal or perpendicular magnetic recording disk.

Figure 6:
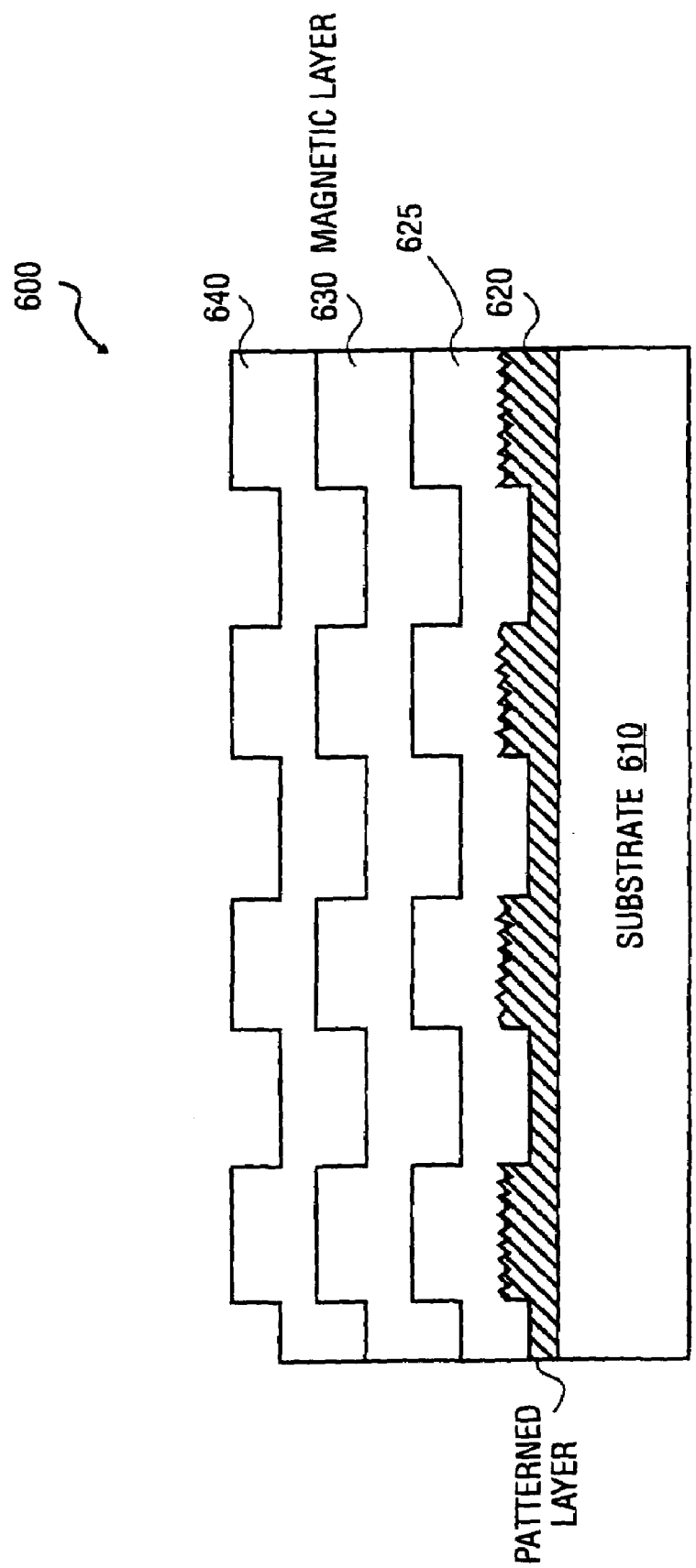
FIG. 6 is a cross section illustrating one embodiment of a recording disk having a patterned nickel-phosphorus layer.

FIG. 6 is a cross section illustrating one embodiment of a longitudinal magnetic recording disk 600 having a patterned NiP layer 620 disposed above disk substrate 610. In one embodiment, a textured discrete track pattern is generated on NiP layer 620, as discussed above. After the patterned NiP layer 620 is textured (e.g., by the methods described above with respect to FIG. 2A-2G or 3A-3F), additional layers such as a magnetic layer 630 may be formed above NiP layer 620 to generate a magnetic recording disk. In one embodiment, one or more layers 625 may also be disposed between NiP layer 620 and magnetic layer 630 (e.g., an underlayer and/or an intermediate layer) to facilitate a certain crystallographic growth within the magnetic layer 630. For example, an intermediate layer and/or an underlayer may be deposited on NiP layer 620 to provide a surface on which magnetic layer 630 may be epitaxially grown to control crystal morphology and orientation for obtaining a two dimensional isotropic media. These layers may be composed of materials to provide reasonably good lattice match to the material used for the magnetic layer 630. Such layers are known in the art; accordingly, a detailed discussion is not provided.

The disk 600 may also include one or more layers 640 on top of the magnetic layer 630. For example, a protection layer (e.g., layer 640) may be deposited on top of the magnetic layer 630 to provide sufficient property to meet tribological requirements such as contact-start-stop (CSS) and corrosion protection. Predominant materials for the protection layer are carbon-based materials, such as hydrogenated or nitrogenated carbon. A lubricant may be placed on top of the protection layer to further improve tribological performance, for example, a perfluoropolyether or phosphazene lubricant. Protection and lubrication layers are known in the art; accordingly, a detailed discussion is not provided.

Figure 7:
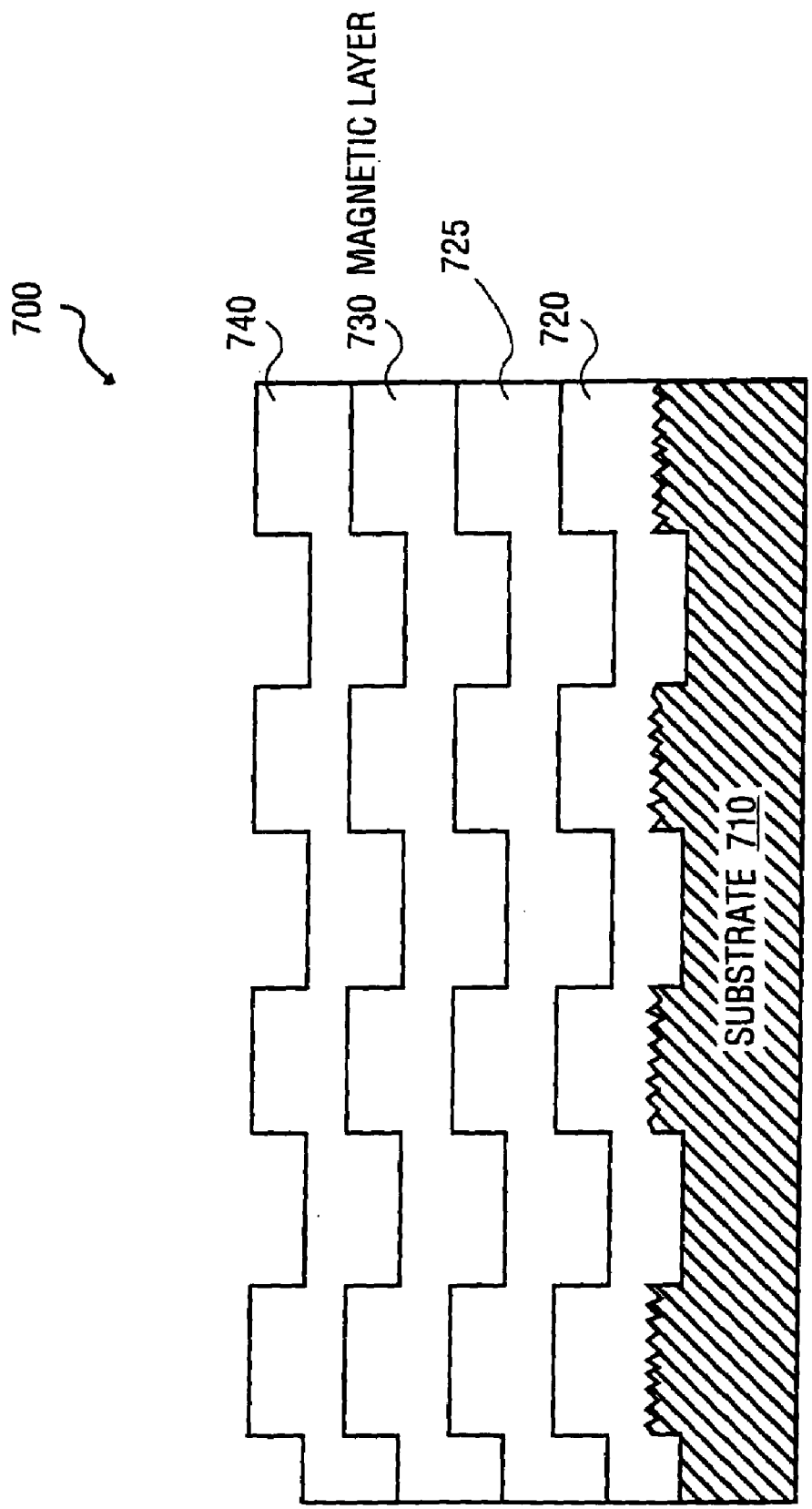
FIG. 7 is a cross section illustrating one embodiment of a recording disk having a patterned substrate.

FIG. 7 is a cross section illustrating one embodiment of a longitudinal magnetic recording disk 700 having a patterned substrate 710. In one embodiment, a textured discrete track pattern is generated on substrate 710, as discussed above. After the patterned substrate 710 is textured (e.g., by the methods described above with respect to FIG. 4A-4G or 5A-5F), additional layers such as a magnetic layer 730 may be formed above substrate 710 to generate a magnetic recording disk. In one embodiment, one or more layers 720, 725 may also be disposed between substrate 710 and magnetic layer 730 (e.g., an underlayer and/or an intermediate layer) to facilitate a certain crystallographic growth within the magnetic layer 730. For example, an intermediate layer and/or an underlayer may be deposited on substrate to provide a surface on which magnetic layer 730 may be epitaxially grown to control crystal morphology and orientation for obtaining a two dimensional isotropic media. These layers may be of materials to provide reasonably good lattice match to the material used for the magnetic layer 730. Magnetic layers are known in the art; accordingly, a detailed discussion is not provided. The disk 700 may also include one or more layers 740 on top of the magnetic layer 730. For example, a protection layer (e.g., layer 740) may be deposited on top of the magnetic layer 730 to provide sufficient property to meet tribological requirements such as contact-start-stop (CSS) and corrosion protection.

Figure 8A:
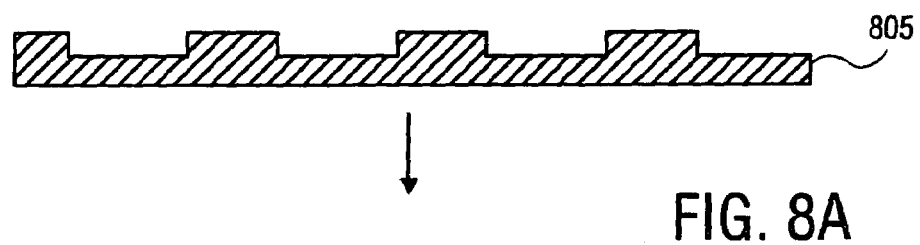
FIGS. 8A-8B show expanded cross sectional views illustrating an exemplary embodiment of a method of depositing a soft magnetic underlayer on a patterned substrate.
Figure 8B:

A substrate having a discrete track recording pattern may be used in perpendicular magnetic recording systems. In perpendicular magnetic recording systems, the recorded bits are arranged as antiparallel magnets in relation to one another, and are recorded normal to the surface plane of the magnetic medium. Obeying the pull of magnetic poles, recordings are attracted in high recording density cohesion instead of demagnetizing. In contrast, conventional longitudinal magnetic recording systems demagnetize under repulsive forces. A perpendicular magnetic recording system, therefore, has a larger recording capacity compared to a longitudinal magnetic recording system. Perpendicular magnetic recording systems typically include a hard magnetic recording layer and a soft magnetic underlayer which provide a flux path from the trailing write pole to the leading opposing pole of the writer. FIGS. 8A-8B show expanded cross sectional views illustrating an exemplary embodiment of a method of depositing a soft magnetic underlayer on a patterned substrate. FIG. 8A shows a substrate 805 having a discrete track recording pattern formed therein. In one embodiment, the patterned substrate 805 may be formed by the subtractive process described above with respect to FIGS. 4A-4G. In an alternative embodiment, the patterned substrate 805 may be formed by the additive process described above with respect to FIGS. 5A-5F. In another embodiment, patterned substrate 805 may also be textured (e.g., as shown above by 405, 505). FIG. 8B shows a soft magnetic underlayer 810 deposited on patterned substrate 805. Soft magnetic underlayer 810 may be deposited thinly enough on substrate 805 to preserve the pattern of the recessed zones (i.e., track grooves). The soft magnetic underlayer 810 may be disposed over substrate 805 by any one of the deposition methods described above.

Figure 9:
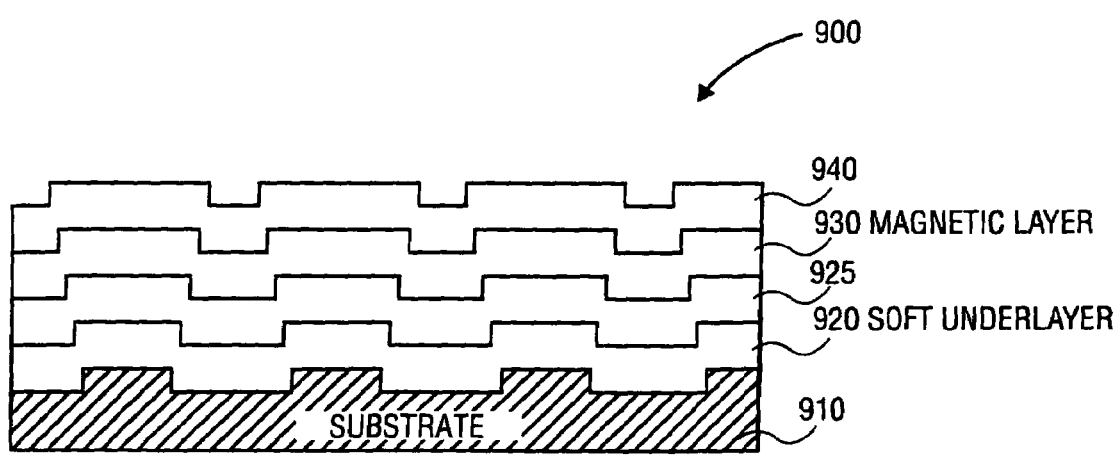
FIG. 9 is a cross section illustrating one embodiment of a recording disk having a soft magnetic underlayer deposited on a patterned substrate.

FIG. 9 is a cross section illustrating one embodiment of a perpendicular magnetic recording disk 900 having a patterned substrate 910. A discrete track pattern is generated on substrate 910, as discussed above. After a soft magnetic underlayer 920 is deposited on substrate 910, additional layers such as a magnetic layer 930 may be formed above substrate 910 to generate a perpendicular magnetic recording disk. One or more layers 925 may also be disposed between substrate 910 and magnetic layer 930 (e.g., an intermediate layer) to facilitate a certain crystallographic growth within the magnetic layer 930. These layers may be of materials to provide reasonably good lattice match to the material used for the magnetic layer 930. The disk 900 may also include one or more layers 940 on top of the magnetic layer 930. For example, a protection layer (e.g., layer 940) may be deposited on top of the magnetic layer 930 to provide sufficient property to meet tribological requirements such as contact-start-stop (CSS) and corrosion protection.

In one embodiment, the disk substrate 910 that is used to generate a perpendicular magnetic recording disk 900 may be textured, for example, to improve signal to noise ratio (SNR) and thermal stability of the magnetic recording disk. The texturing of a substrate for both longitudinal and perpendicular magnetic recording disks may improve SNR and thermal stability by enabling control of crystallite size and crystallite size variance in the film layers deposited over the substrate. Although there are contributions to SNR from the disk drive electronics and the channel used to process the magnetic signal, there is also intrinsic noise from the media, itself, that should be minimized. A large contribution to the media noise is generated from the inter-particle (or inter-crystalline) magnetic exchange interaction that may be suppressed by isolating the magnetic crystals from each other by one or more nonmagnetic elements or compounds. However, another source of intrinsic media noise is the crystalline size and variance of the magnetic grain. The texturing of a substrate for both longitudinal and perpendicular magnetic recording disks may improve control of crystallite size, spacing, and variance of the grains in the film layers (e.g., intermediate layer, underlayer, and/or nucleation layer) deposited over the substrate and, thereby, the magnetic layer.

In an alternative embodiment, the soft magnetic underlayer disposed above the disk substrate may be polished and/or textured. The soft magnetic underlayer may be textured with a pattern, by various methods such as mechanical texturing using fixed or free abrasive particles (e.g., diamond). Alternatively, other types of texturing methods, such as laser texturing, may be used to texture the soft magnetic underlayer. In one embodiment, the texturing of the soft magnetic underlayer may be in addition to the texturing of a NiP layer disposed above the substrate. In an embodiment where the NiP layer is absent, the substrate may be polished and/or textured. In yet another embodiment, a thin NiP layer may be disposed on soft magnetic underlayer and polished and/or textured. A polished and/or textured NiP layer may be in addition to a (polished and/or textured) NiP layer disposed above the substrate.

Figure 10:
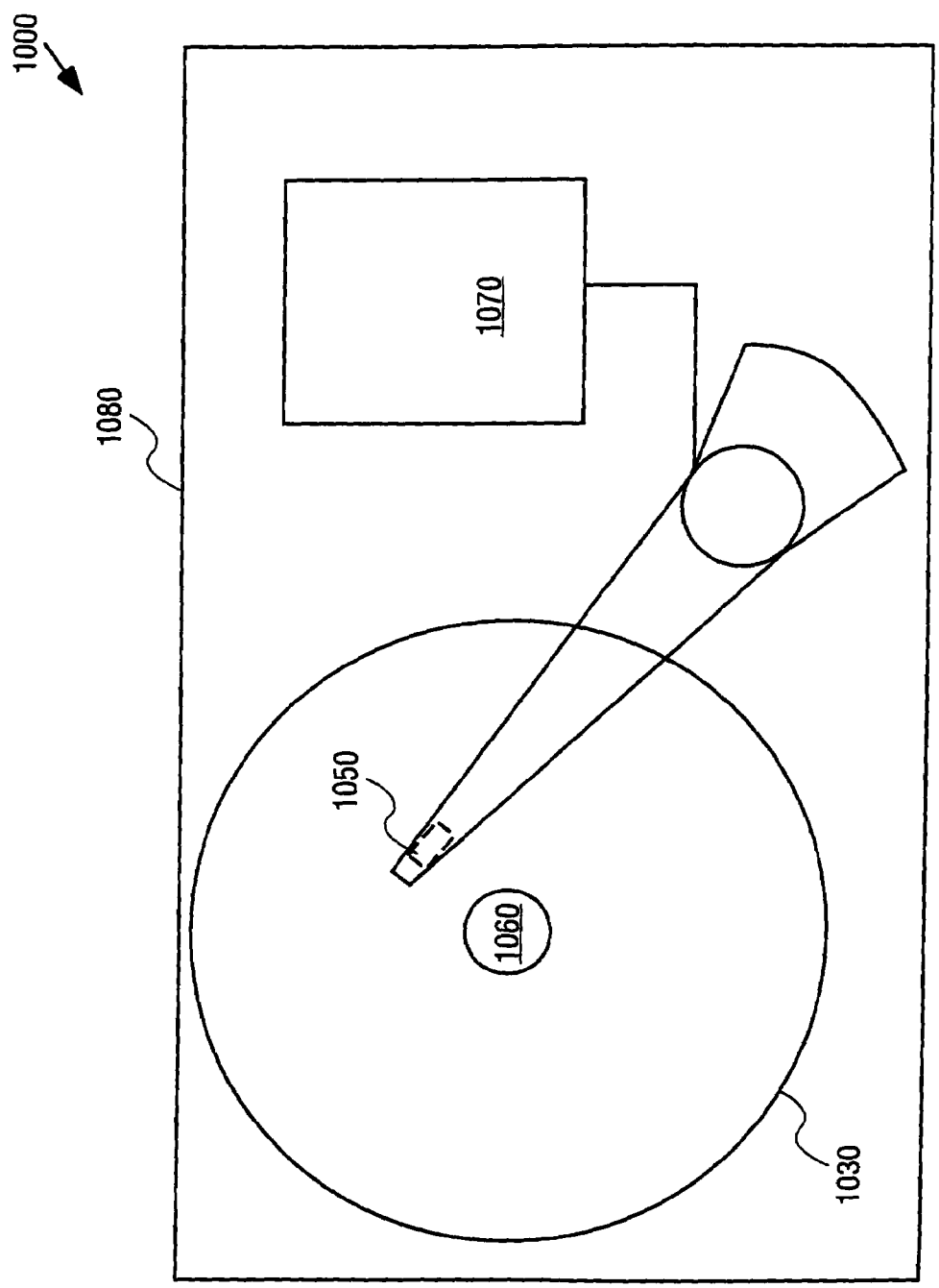
FIG. 10 illustrates one embodiment of a disk drive.

FIG. 10 illustrates a disk drive having a disk (e.g., disk 600 700, or 900). Disk drive 1000 may include one or more of the disks 1030 to store datum. The disk(s) 1030 resides on a spindle assembly 1060 that is mounted to drive housing 1080. Datum may be stored along tracks in the magnetic recording layer of a disk. The reading and writing of datum is accomplished with head 1050 that is used to alter the properties of the magnetic layer. A spindle motor (not shown) rotates spindle assembly 1060 and, thereby, the disk 1030 to position head 1050 at a particular location along a desired disk track. The position of head 1050 relative to disk 600 may be controlled by position control circuitry 1070.

In the foregoing specification, the invention has been described with reference to specific exemplary embodiments thereof. It will, however, be evident that various modifications and changes may be made thereto without departing from the broader spirit and scope of the invention as set forth in the appended claims. The specification and figures are, accordingly, to be regarded in an illustrative rather than a restrictive sense.

What is claimed is:

1. A method of fabricating a magnetic recording disk, comprising:
    disposing a layer comprising NiP above a top surface of a substrate, wherein the substrate comprises a first material;
    disposing an embossable layer above the NiP layer;
    imprinting the embossable layer to generate an imprinted embossable layer;
    etching the imprinted embossable layer to generate a plurality of exposed areas of the layer comprising NiP beneath the embossable layer;
    disposing a second material in the plurality of exposed areas to form a plurality of raised zones of a discrete track recording pattern, wherein the raised zones constitute tracks of the discrete track recording pattern and are raised relative to the top surface of the substrate, wherein the second material comprises NiP; and
    disposing a magnetic recording layer above the substrate.

2. The method of claim 1, wherein imprinting comprises imprint lithography.

3. The method of claim 1, wherein the layer comprising NiP is electroplated on the substrate.

4. The method of claim 1, wherein the layer comprising NiP is electroless-plated on the substrate.

5. A method of fabricating a magnetic recording disk, the method comprising:
    disposing a first layer comprising NiP on a top surface of a substrate;
    forming a discrete track recording pattern in the first layer, wherein the first layer is continuous throughout the discrete track recording pattern, wherein forming comprises:
        disposing an embossable layer above the first layer;
        imprinting the embossable layer to generate an imprinted embossable layer;
        etching the imprinted embossable layer to generate a plurality of exposed areas beneath the embossable layer;
        disposing a second layer comprising a second material above the imprinted embossable layer, wherein the second material comprises NiP; and
        removing the embossable layer to lift off overlaying second material, wherein the second material is retained in the plurality of exposed areas to form a plurality of raised zones of the discrete track recording pattern, wherein the raised zones constitute tracks of the discrete track recording pattern and are raised relative to the top surface of the substrate, wherein the plurality of raised zones formed by the second material is retained on the substrate; and disposing a magnetic recording layer above the substrate.

6. The method of claim 5, further comprising texturing the second material retained in the plurality of exposed areas.

7. The method of claim 5, further comprising polishing the second material retained in the plurality of exposed areas.

* * * * *